(12) United States Patent
Magor et al.

(10) Patent No.: US 8,191,470 B2
(45) Date of Patent: Jun. 5, 2012

(54) SCREW SHAFT SURFACE

(75) Inventors: Wolfgang Magor, Graz (AT); Peter Scheucher, Kumberg (AT); Hubert Riemer, St. Oswald (AT)

(73) Assignee: Andritz AG, Graz (AT)

( * ) Notice: Subject to any disclaimer, the term of this patent is extended or adjusted under 35 U.S.C. 154(b) by 226 days.

(21) Appl. No.: 12/313,944

(22) Filed: Nov. 26, 2008

(65) Prior Publication Data
US 2009/0173241 A1 Jul. 9, 2009

(30) Foreign Application Priority Data
Nov. 30, 2007 (AT) .................................. A 1959/2007

(51) Int. Cl.
*B30B 9/12* (2006.01)
(52) U.S. Cl. ........................................ 100/117; 100/145
(58) Field of Classification Search .................. 100/117, 100/145, 146
See application file for complete search history.

(56) References Cited

U.S. PATENT DOCUMENTS

| | | | | |
|---|---|---|---|---|
| 2,662,243 A | * | 12/1953 | Schnuck et al. | 366/81 |
| 3,246,597 A | * | 4/1966 | Burner | 100/145 |
| 5,341,730 A | * | 8/1994 | Tydiks | 100/37 |
| 5,743,178 A | * | 4/1998 | Babbini | 100/127 |

FOREIGN PATENT DOCUMENTS
AT 412 857 B 8/2005
* cited by examiner

*Primary Examiner* — Jimmy T Nguyen
(74) *Attorney, Agent, or Firm* — Alix, Yale & Ristas, LLP

(57) ABSTRACT

Screw press, preferably for removing liquid from a material to be conveyed, comprising a screw shaft (1) complete with a helical conveying flight (2) mounted on the screw shaft (1) and a housing shell (3) surrounding it, where a transport channel (4) is formed for the material to be conveyed between the screw shaft (1), the conveying flight (2), and the housing shell (3). In order to prevent conveyed material components from adhering to the screw shaft (1), and thus uneven filling of the transport channel (4), the invention provides for the screw shaft (1) to have a surface profile (5), at least in one section of the transport channel (4).

22 Claims, 3 Drawing Sheets

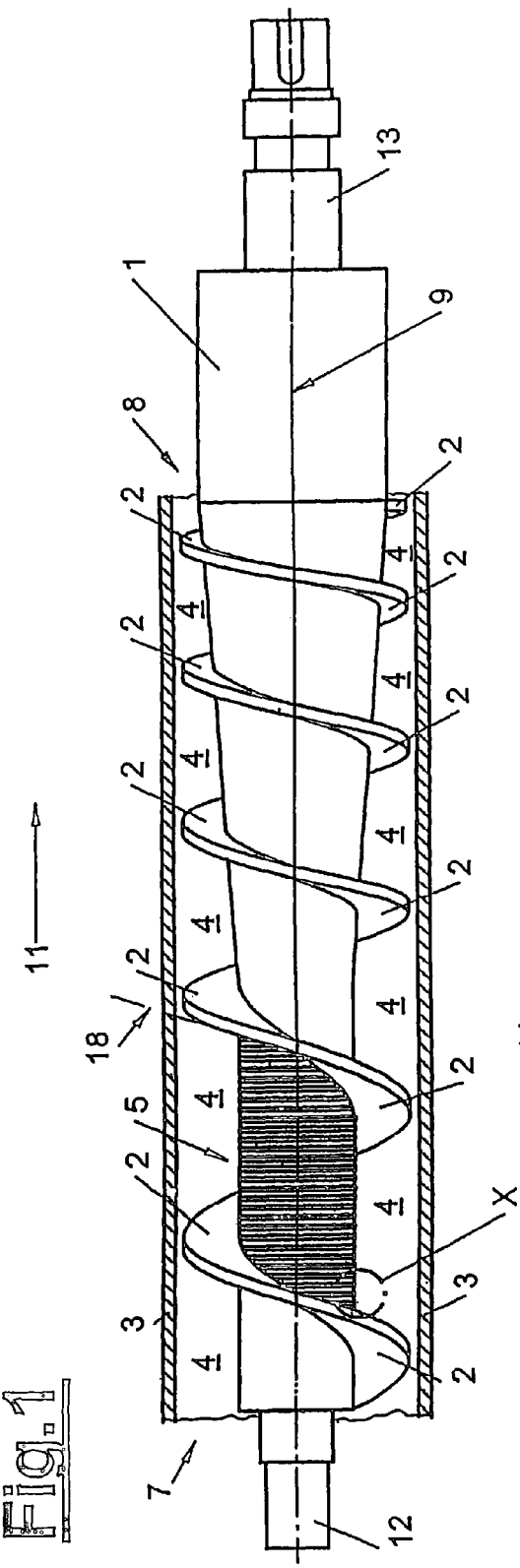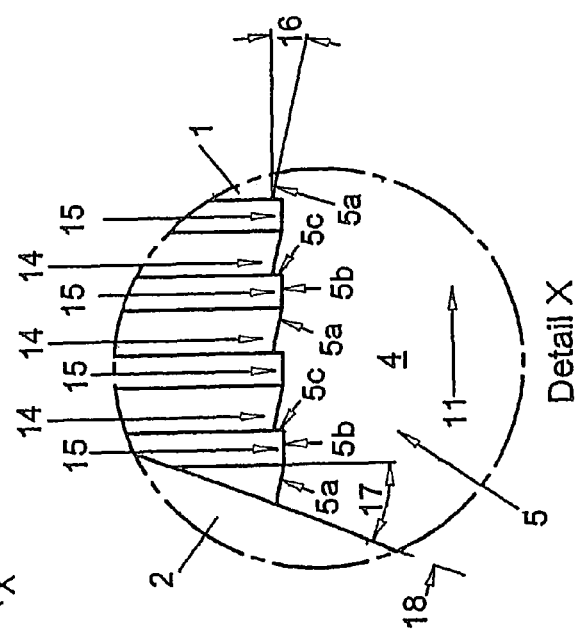

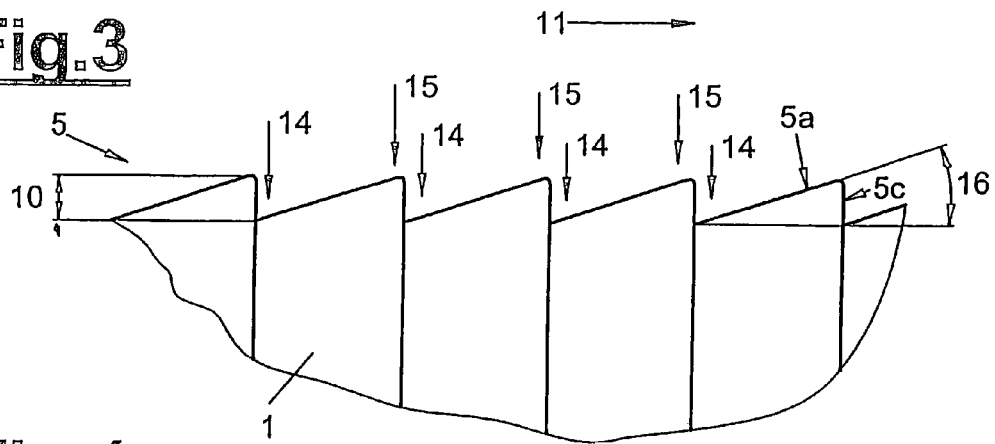
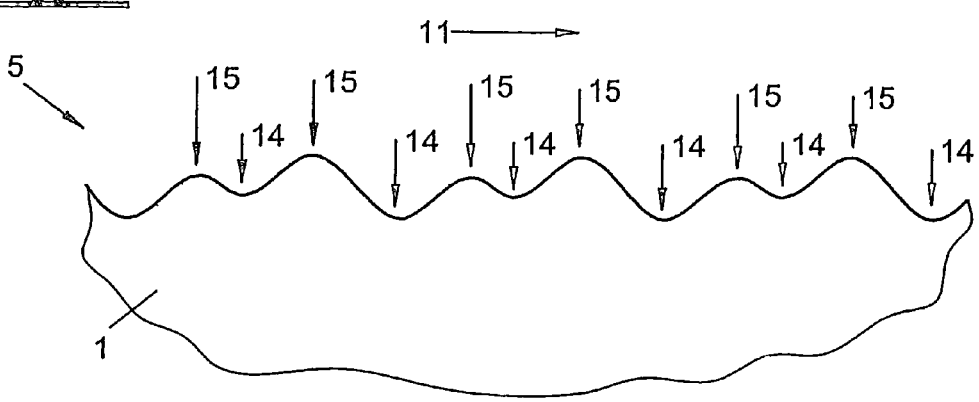
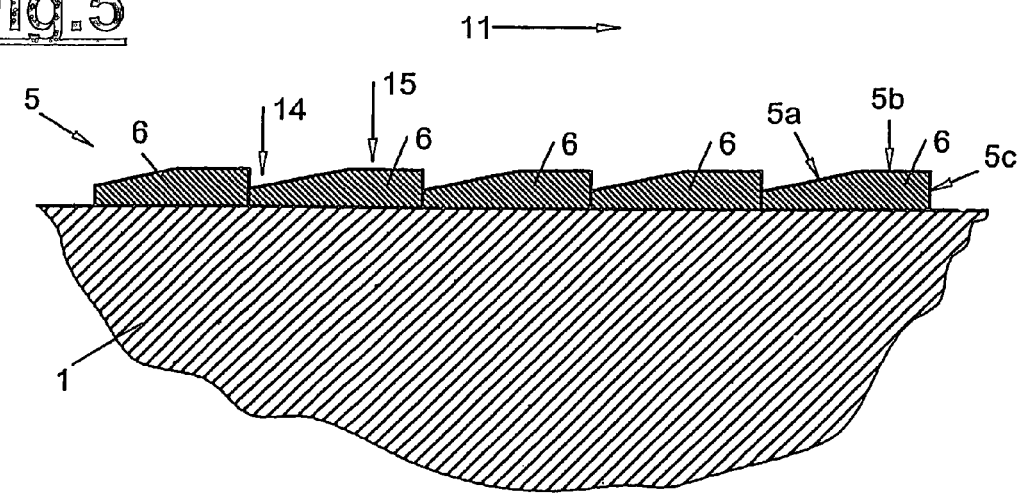

SCREW SHAFT SURFACE

BACKGROUND

The invention relates to a screw press, preferably for removing liquid from a material to be conveyed, comprising a screw shaft complete with a helical conveying flight mounted on the screw shaft and a housing shell surrounding it, where a transport channel is formed for the material to be conveyed between the screw shaft, the conveying flight, and the housing shell.

The conveyed material to be processed by the screw press is usually a solid-liquid mixture, for example industrially manufactured pulp fibres, from which the entrained liquid is to be extracted.

The principle of the pressing process effected by the screw press is sufficiently well known: A screw shaft with a conveying flight is mounted on bearings inside a cylindrical or conical housing shell. The housing shell has a filling port provided with a filling funnel and also an outlet port provided with an outlet nozzle.

Helical transport channels are formed between the housing shell, the screw shaft and the conveying flight, leading from the filling port to the outlet port and which narrow successively towards the area of the outlet port.

When the screw shaft is set in rotation, material to be conveyed that is fed to the screw press through the filling port is conveyed along the transport channels to the outlet port by the conveying flight mounted on the screw shaft and is compacted and dried by pressing continuously during this process.

Liquid removed from the conveyed material during this compacting process is directed through slotted or perforated liquid passages in the housing shell to a collecting device.

A screw press of this kind is known, for example from AT 412 857 B.

Particular problems have arisen with screw presses of the generic kind because the conveyed material transported in the transport channels causes constant abrasion to the screw shaft, and after a certain period in operation, the surface of the screw shaft is finally rubbed away leaving a polished surface. There is a tendency for the conveyed material, e.g. the pulp fibres, to stick to a screw shaft that has been smoothed in this way and thus to rotate more together with the screw shaft than was the case with the previously rough screw shaft.

Increased rotation of the conveyed material with the screw shaft leads to a lower throughput speed of the conveyed material through the conveying channels, which has to be compensated in turn by increased screw shaft speed and thus, higher energy input.

Furthermore, the conveyed material components adhering to the screw shaft cause uneven filling, or even plugging, of the transport channels.

A further undesirable consequence of the described tendency to adhere to the screw shaft is that liquid removal from the conveyed material—viewed in a comparison of the individual conveying channel sectors distributed along the length of the screw shaft—becomes less homogenous.

Several attempts have already been made to counteract this problem of screw shafts rubbed away to a smooth surface.

The methods put into practice included coating the screw shaft surface with a suitable substance, e.g. tungsten carbide, and thus maintaining a rough surface accompanied by a lower tendency to adhere to the screw shaft for a longer period. These coatings are sprayed or sinter-fused directly onto the screw shaft or onto a sheet metal element that is then secured to the surface of the screw shaft.

The disadvantage of these kinds of coating process is that they are very complicated and very expensive. The sustainability achieved by coating is still unsatisfactory, and practical experience has shown that the coating applied to the screw shaft was already worn after less than two years in the treatment of waste paper with a relatively high ash content, for example, and the screw shaft was rubbed away to a smooth surface again, thus making it susceptible to sedimentation of the conveyed material once again.

Due to the considerable effort involved in applying a coating to the screw shaft, however, screw shafts are also roughened again at regular intervals in a grinding process, so that the surface of the screw shaft is virtually restored to the condition it was in immediately after manufacture.

This roughening or reworking must be performed, however, at relatively brief intervals (in some cases every one to three months) and requires considerable manual effort. Since the screw press has to be shut down for this process, there is also a loss of production.

The problem thus addressed by the present invention is to avoid the disadvantages mentioned and to enable the screw shaft to remain free at all times of any conveyed material adhering to it by providing a non-stick surface structure for the screw shaft with a substantially longer life cycle.

SUMMARY

A screw press of the generic kind for removing liquid from a material to be conveyed comprises a screw shaft complete with a conveying flight and a surrounding housing shell, where transport channels are formed for the material to be conveyed between the screw shaft, the conveying flight, and the housing shell. Here, the invention provides for the screw shaft to have a surface profile, at least in one section of the transport channel.

As the screw shaft thus has a profiled surface in some sections, the conveyed material is forced to lift rhythmically off the surface of the screw shaft. This ensures for a very long time that conveyed material is prevented from adhering to the screw shaft, possibly even for the entire service life of the screw press. There is no need to re-grind or coat the screw shaft, thus shutdown times can be avoided and production efficiency of the screw shaft increased.

In order to effect continuous lifting of the conveyed material off the surface of the screw shaft, it is important that the flow of the material to be conveyed, as defined by the helical conveying flight, is interrupted or crossed by the surface profile according to the invention. Thus, a preferred embodiment of the invention provides for the surface profile to have grooves and elevations that run on an incline to the helical path of the conveying flight (i.e. not parallel to it). In other words, the grooves/elevations run on an incline to a generatrix of the helical conveying flight observed in a side view of the screw shaft.

In a preferred embodiment of the surface profile according to the invention, the grooves and elevations run largely in the circumferential direction of the screw shaft, i.e. largely perpendicular to the axis of the screw shaft. A surface profile of this kind is easy to manufacture and causes effective lifting of the material to be conveyed off the surface of the screw shaft.

In a preferred embodiment, the surface profile is manufactured in one piece together with the screw shaft, where the surface profile is preferably worked from the screw shaft by means of a machining process. An embodiment of this kind proves to be sturdy and allows a simple manufacturing process.

As an alternative, the surface profile can also consist of any number of attached elements manufactured separately from the screw shaft and then mounted on the screw shaft subsequently. The attached elements can be pre-fabricated by means of a suitable process. The design of the surface profile as attached element(s) permits retrofitting of screw shafts already in operation.

In a cost-saving embodiment the attached element is a sheet metal strip (optionally pre-shaped or machined). It is possible to wind the attached element onto the screw shaft like a thread in order to achieve advantages in manufacturing and assembly work.

The attached elements can be secured to the screw shaft easily and firmly by welding.

According to a preferred embodiment variant of the invention, the surface profile—viewed in a cross-section along the length of the screw shaft—has a profile section that rises, preferably by an angle between 5 and 45° in relation to the screw shaft axis, viewed in conveying direction, and a profile section that falls, preferably largely perpendicular to the screw shaft axis, again in the direction of the screw shaft axis. With this form of surface profile, the material to be conveyed is lifted off the surface of the screw shaft continuously and cannot harden onto the surface of the screw shaft.

In practical trials, the surface profile showed particularly good non-stick properties when a further profile section running largely parallel to the screw shaft axis was provided between the rising profile section and the falling profile section.

Here, any desired number of such profile section groups can be mounted one after the other on the screw shaft.

In a preferred embodiment the surface profile has a profile depth of at least 0.5 mm, measured perpendicular to the screw shaft axis. With a profile depth of this kind there is no risk of the surface profile becoming worn quickly.

BRIEF DESCRIPTION OF THE DRAWING

The drawing shows an embodiment, for which:

FIG. 1 shows a schematic diagram of a screw shaft according to the invention,

FIG. 2 shows a detail "X" from FIG. 1,

FIG. 3 shows an alternative embodiment of a screw shaft surface profile according to the invention, FIG. 4 shows an alternative embodiment of a screw shaft surface profile according to the invention, FIG. 5 shows an alternative embodiment of a screw shaft surface profile according to the invention.

DETAILED DESCRIPTION

Figure 6:
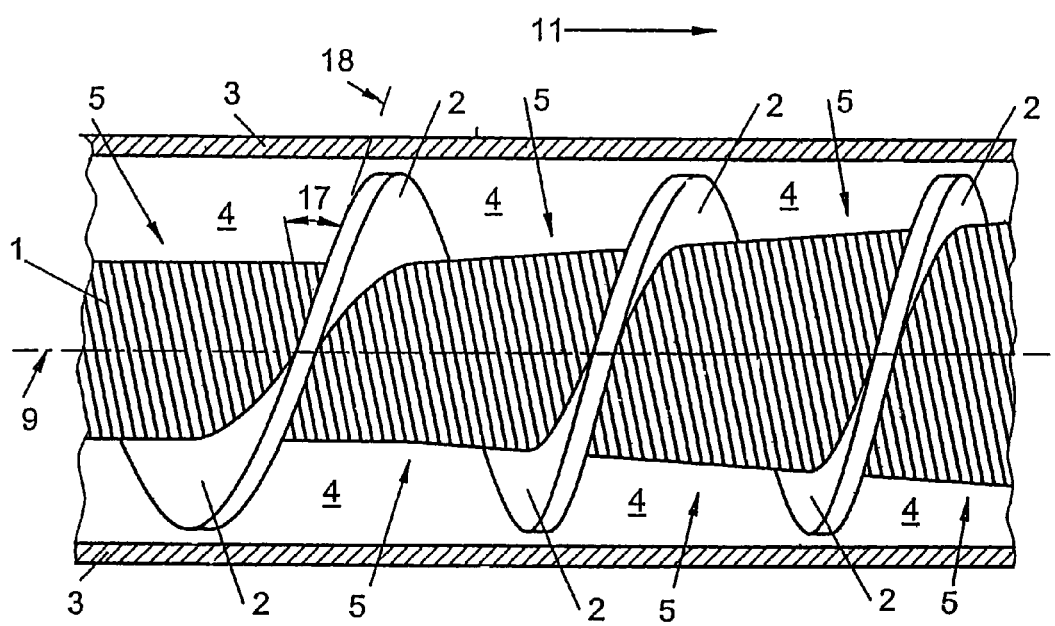
FIG. 6 shows an alternative embodiment of a screw shaft surface profile.

FIG. 1 shows a screw shaft 1 according to the invention, which is intended for installation in a housing shell 3 of a screw press that is only shown schematically.

The housing shell 3, shown with a cylindrical design in the present embodiment, has a filling port 7 with a filling funnel (not shown) for a respective conveyed material and an outlet port 8 with an outlet nozzle (also not shown).

The screw shaft 1 is supported on bearing assembly sections 12, 13 in the housing shell and has a helical conveying flight 2 whose turns narrow successively according to FIG. 1 from the direction of the filling port 7 towards the outlet port 8, where the screw shaft 1 has a tapered section that broadens towards the outlet port 8 in order to effect progressive compacting of the material being conveyed in conveying direction 11.

The screw shaft 1 can be set in rotation by a drive device, where the material to be conveyed is directed through a helical transport channel 4, formed between the housing shell 3, the screw shaft 1 and the conveying flight 2, and undergoes progressive dewatering in this process.

In order to discharge liquid removed in this way from the conveyed material, liquid passages are provided in the housing shell 3 (not shown) that are slotted or perforated in design. The liquid draining off through the liquid passages is collected in a collecting device provided for this purpose.

The conveyed material to be compacted by the screw press can be pulp or sludge suspensions, for example, waste paper, sawdust, waste wood, or plastic, cardboard or wooden packaging.

In order to prevent the abrasive wear on the screw shaft 1 caused by such materials and the disadvantages thereof already described above for as long as possible, the invention provides for the screw shaft 1 having a surface profile 5, at least in the area of one section of the transport channel 4. A surface profile 5 of this kind is shown simply by way of example in FIG. 2, which shows a detail "X" from FIG. 1.

As a basic principle, the surface profile 5, however, can be composed of any number of related grooves 14 and elevations 15 (see also FIG. 3 and FIG. 4). The geometry of the surface profile 5 can be selected according to field of application or type of material to be conveyed. Here, the surface profile 5 should, however, have a profile depth 10 of at least 0.5 mm, measured perpendicular to a screw shaft axis 9, in order to avoid rapid abrasion.

It should be noted that the surface profile 5 according to the invention is only shown partially in FIG. 1 and would extend in practice over the entire surface of the screw shaft 1 facing the transport channel 4 (as shown in FIG. 6). It is also possible, however, to only provide the screw shaft 1 with a surface profile 5 in selected sections, e.g. only in an area preceding the outlet port 8, as the conveyed material tends mainly to solidify in those sections of the transport channel 4 because of the high degree of compression.

The grooves 14 and the elevations 15 of the surface profile 5 according to the invention are arranged such that they always run on a certain incline 17 to the helical path of the conveying flight 2 or cross the path of the transport channel 4. To be more precise, the grooves 14 and elevations 15 run on an incline 17 to a generatrix 18 of the helical conveying flight 2 (entered in FIGS. 1, 2 and 6), observed in a side view of the screw shaft 1.

In a preferred embodiment of the surface profile 5 according to the invention, the grooves 14 and the elevations 15 run largely in circumferential direction of the screw shaft 1 or perpendicular to the screw shaft axis 9 (as shown in FIGS. 1 to 3).

Similarly, it would be possible for the grooves 14 and elevations 15 of the surface profile 5 to run on any desired incline to the screw shaft axis 9, e.g. diverge slightly from an imaginary perpendicular on the screw shaft axis 9 (as shown in FIG. 6).

The grooves 14 and elevations 15 should, in any event, not be arranged here to be parallel to the path of the conveying flight 2 and the transport channel 4, but should cross it on a larger or smaller incline 17 in order to guarantee that the conveyed material lifts rhythmically off the surface of the screw shaft 1.

In order to achieve adequate wear resistance, the surface profile 5 should have a profile depth 10 of at least 0.5 mm, measured perpendicular to the screw shaft axis. If a screw press is intended for dewatering pulp fibres that are saturated with water, a profile depth 10 of 1.2 mm is proposed.

The surface profile 5 can be manufactured in one piece with the screw shaft 1, where it is worked from the screw shaft 1 in a turning or milling process. Here, the screw shaft 1 is given a profile by means of a suitable machining process before the conveying flight 2 is mounted or welded onto the screw shaft 1.

As an alternative, the surface profile 5 can also be one or several attachment elements 6 manufactured separately and secured to the screw shaft 1. In FIG. 5, for example, a large number of attached elements are shown, designed in the form of pre-machined sheet metal strips that are wound onto the screw shaft 1. The attachment elements or sheet metal strips 6 are welded onto the screw shaft 1 here. Of course, the sheet metal strip or the attachment elements 6 can also be designed in one piece and wound onto the screw shaft 1 like a thread.

A particularly preferred embodiment of the surface profile 5 according to the invention is shown in FIG. 2. Here, the surface profile 5 (viewed in a cross-section through the screw shaft 1 lengthwise and in conveying direction 11) has a first profile portion 5a that rises compared to the screw shaft axis 9, then a second profile portion 5b running largely parallel to the screw shaft axis 9, and finally a third profile portion 5c falling again in the direction of the screw shaft axis 9.

The profile portion 5a that rises compared to the screw shaft axis 9 can have an angle 16 of between 5 and 45° measured in relation to the screw shaft axis 9. In order to keep the sliding friction by the conveyed material low, however, an angle 16 of between 5 and 20°, preferably an angle 16 of approximately 10°, is suggested.

In the present embodiment, the third profile portion 5c drops by approximately 90° in the direction of the screw shaft axis 9.

Depending on the field of application and the size of the screw press, any desired number of such profile portion groups 5a, 5b, 5c, or 5a and 5c, can be arranged one after the other on the screw shaft 1.

It goes without saying that a multiplicity of variations are conceivable in the embodiment of the surface profile 5 according to the invention, e.g. a serrated surface profile 5 according to FIG. 3, a wavy profile according to FIG. 4, scaled profiles, as well as any desired criss-cross or knurled pattern.

The invention claimed is:

1. A screw press for removing liquid from a material to be conveyed, comprising a screw shaft having an outer surface and rotatable about a shaft axis, a helical conveying flight mounted on the screw shaft and defining successive turns, and a housing shell surrounding the conveying flight, whereby a transport channel is formed for the material to be conveyed in a conveying direction between the screw shaft, the conveying flight, and the housing shell, and the successive turns define respective successive sections of the transport channel, wherein the improvement comprises that the screw shaft has a surface profile in a section of the transport channel, said surface profile comprising multiple grooves and elevations that run on an incline to a generatrix of the helical conveying flight observed in a side view of the screw shaft, perpendicularly to the axis.

2. The screw press according to claim 1, wherein the surface profile viewed in a cross-section along the axis of the screw shaft has a rising profile portion that rises by an angle between 5 and 45° in relation to the screw shaft axis viewed in the conveying direction, and a falling profile portion that falls substantially perpendicularly to the screw shaft axis in the direction of the screw shaft axis.

3. The screw press according to claim 2, including another profile portion running substantially parallel to the screw shaft axis provided between the rising profile portion and the falling profile portion.

4. The screw press according to claim 2, wherein the screw shaft has a plurality of sections and in each section several profile portion groups are provided one after the other in the conveying direction.

5. The screw press according to claim 1, wherein the surface profile is manufactured in one piece together with the screw shaft.

6. The screw press according to claim 1, wherein the surface profile comprises at least one attached element manufactured separately from and mounted on the screw shaft.

7. The screw press according to claim 6, where the attached element is a sheet metal strip.

8. The screw press according to claim 6, wherein the attached element is wound onto the screw shaft.

9. The screw press according to claim 6, wherein the attached element is welded to the screw shaft.

10. The screw press according to claim 1, wherein the surface profile has a depth of at least 0.5 mm, measured perpendicular to the screw shaft axis.

11. The screw press according to claim 1, wherein the surface profile has grooves and elevations that run substantially circumferentially around the screw shaft.

12. The screw press according to claim 11, wherein the surface profile viewed in a cross-section along the axis of the screw shaft has a rising profile portion that rises by an angle between 5 and 45° in relation to the screw shaft axis viewed in the conveying direction, and a falling profile portion that falls substantially perpendicularly to the screw shaft axis in the direction of the screw shaft axis.

13. The screw press according to claim 3, wherein the screw shaft has a plurality of sections and in each section several profile portion groups are provided one after the other in the conveying direction.

14. The screw press according to claim 12, wherein the screw shaft has a plurality of sections and in each section several profile portion groups are provided one after the other in the conveying direction.

15. The screw press according to claim 11, wherein the surface profile has a depth of at least 0.5 mm, measured perpendicularly to the screw shaft axis.

16. The screw press according to claim 15, wherein the surface profile has a depth of between about 0.5 and 1.2 mm, measured perpendicularly to the screw shaft axis.

17. The screw press according to claim 1, wherein the profile extends over the entire surface of the screw shaft in said section.

18. The screw press according to claim 1, wherein the screw press has a plurality of transport channel sections and a profile extends over the entire surface of the screw shaft in all said sections.

19. The screw shaft according to claim 1, wherein the screw press has a plurality of transport channel sections, and a profile extends over the entire surface of each said section, whereby within each of the plurality of sections material conveyed along the shaft is continuously lifted off the surface of the shaft along the entire length of said section.

20. A screw press for removing liquid from a material to be conveyed, comprising:
a housing shell;
a screw shaft having a shaft outer surface and rotatable within the shell about a shaft axis;

a helical conveying flight projecting from the screw shaft outer surface toward the shell, whereby a transport channel is formed for the material to be conveyed in a conveying direction between the screw shaft surface, the conveying flight, and the housing shell;

wherein at least some of the shaft outer surface is profiled with multiple grooves and elevations that run on an incline to a generatrix of the helical conveying flight, as observed in a side view of the screw shaft, perpendicularly to the axis.

21. The screw press according to claim 20, wherein the helical conveying flight has a plurality of turns and each turn defines a respective transport channel section; and said profile extends over the entire surface of the screw shaft surface in at least one transport channel section.

22. The screw press according to claim 20, wherein the profile continuously lifts material from the shaft surface while the material is conveyed through the transport channel.

* * * * *